United States Patent
Richards et al.

(10) Patent No.: US 12,072,614 B2
(45) Date of Patent: Aug. 27, 2024

(54) PROJECTION SYSTEM AND METHOD WITH ADJUSTABLE ANGLE ILLUMINATION

(71) Applicant: Dolby Laboratories Licensing Corporation, San Francisco, CA (US)

(72) Inventors: Martin J. Richards, Gig Harbor, WA (US); Trevor Davies, Walnut Creek, CA (US); Barret Lippey, Foster City, CA (US); Nathan Shawn Wainwright, Melissa, TX (US); Darren Hennigan, Prosper, TX (US); John David Jackson, Allen, TX (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 114 days.

(21) Appl. No.: 17/920,311

(22) PCT Filed: Apr. 23, 2021

(86) PCT No.: PCT/US2021/028827
§ 371 (c)(1),
(2) Date: Oct. 20, 2022

(87) PCT Pub. No.: WO2021/216991
PCT Pub. Date: Oct. 28, 2021

(65) Prior Publication Data
US 2023/0161234 A1  May 25, 2023

Related U.S. Application Data

(60) Provisional application No. 63/014,239, filed on Apr. 23, 2020.

(30) Foreign Application Priority Data

Apr. 23, 2020 (EP) .................................. 20171002

(51) Int. Cl.
H04N 9/31 (2006.01)
G03B 21/00 (2006.01)
G03B 21/28 (2006.01)

(52) U.S. Cl.
CPC ........... *G03B 21/008* (2013.01); *G03B 21/28* (2013.01)

(58) Field of Classification Search
CPC .... G03B 21/008; G03B 21/28; G03B 21/142; G02B 26/0833; G02B 7/1822;
(Continued)

(56) References Cited

U.S. PATENT DOCUMENTS 6,333,820 B1  12/2001  Hayakawa
6,707,537 B2   3/2004  Dieckmann
(Continued)

FOREIGN PATENT DOCUMENTS

CN  104330897 B   8/2016
EP    3241073 B1  9/2020
(Continued)

OTHER PUBLICATIONS

Chen, Yu-Jia, et al "Designing an Anamorphic Illumination System with an RTIR prism for a tile-and-roll-pixel-type Projector" Applied Optics, vol. 59, Issue 12, pp. 3530-3537, Apr. 20, 2020.
(Continued)

Primary Examiner — Sherrie Hsia

(57) ABSTRACT

A projection system and calibration method therefor relate to a light source configured to emit a light in response to an image data, an illumination optical system configured to steer the light, the illumination optical system including a first mirror and a second mirror, a digital micromirror device (DMD) including a plurality of micromirrors respectively configured to reflect the steered light to a filter as on-state light or to reflect the steered light as off-state light to a light
(Continued)

dump; determining a deviation between an actual angle of orientation and an expected angle of orientation of the DMD; calculating a first amount of angle adjustment corresponding to the first mirror and a second amount of angle adjustment corresponding to the second mirror; and actuating the first mirror according to the first amount and the second mirror according to the second amount.

15 Claims, 11 Drawing Sheets

(58) Field of Classification Search
CPC .. H04N 9/3155; H04N 9/3108; H04N 9/3185; H04N 9/317; H04N 9/3191
USPC ....... 348/744–747, 750, 755, 756, 758, 759, 348/764, 770, 806
See application file for complete search history.

(56) References Cited

U.S. PATENT DOCUMENTS

| | | |
|---|---|---|
| 6,809,873 B2 | 10/2004 | Cobb |
| 7,004,586 B2 | 2/2006 | Morinaga |
| 7,095,560 B2 | 8/2006 | Toyoda |
| 7,204,599 B2 | 4/2007 | Lerner |
| 7,289,090 B2 | 10/2007 | Morgan |
| 7,384,158 B2 | 6/2008 | Ramachandran |
| 7,445,344 B2 | 11/2008 | Lang |
| 7,639,419 B2 | 12/2009 | Chuang |
| 8,231,226 B2 | 7/2012 | Inoue |
| 8,292,438 B2 | 10/2012 | Nishikawa |
| 8,724,086 B2 | 5/2014 | Layh |
| 8,820,941 B2 | 9/2014 | Yang |
| 8,861,078 B2 | 10/2014 | Huang |
| RE45,258 E | 11/2014 | Takaura |
| 9,609,263 B2 | 3/2017 | Nagasawa |
| 9,664,984 B2 | 5/2017 | Nakamura |
| 9,690,179 B2 | 6/2017 | Shibayama |
| 9,983,484 B2 | 5/2018 | Endres |
| 10,073,336 B2 | 9/2018 | Maes |
| 10,345,591 B2 | 7/2019 | Samec |
| 10,620,521 B2 | 4/2020 | Hsu |
| 2002/0001030 A1 | 1/2002 | Kuiseko |
| 2004/0070695 A1 | 4/2004 | Kim |
| 2006/0256295 A1 | 11/2006 | Lang |
| 2006/0279713 A1 | 12/2006 | Wang |
| 2012/0033421 A1 | 2/2012 | Kojima |
| 2015/0124330 A1 | 5/2015 | Ito |
| 2018/0007327 A1 | 1/2018 | Richards |
| 2018/0143427 A1 | 5/2018 | Griffin |
| 2021/0141238 A1 | 5/2021 | Pertierra |
| 2022/0191440 A1 | 6/2022 | Pertierra |

FOREIGN PATENT DOCUMENTS

| | | |
|---|---|---|
| JP | 2007206143 A | 8/2007 |
| JP | 2011248062 A | 12/2011 |
| JP | 2012123128 A | 6/2012 |
| JP | 2013097123 A | 5/2013 |
| WO | 2013151747 A1 | 10/2013 |
| WO | 2019119099 A1 | 6/2019 |

OTHER PUBLICATIONS

Jian, Y. et al "A field lens design of illumination and projection optics for dynamic infrared scene generator based on DMD" 6th International Symposium on Advanced Optical Manufacturing and Testing Technologies: Design, Manufacturing, and Testing of Smart Structures, Micro- and Nano-Optical Devices, and Systems Book Series: Proceedings of SPIE (vol. 8418 Article No. 84180N Published: 2012.

Rausch, D. et al "Phase Space Approach to the use of Integrator rods and Optical Arrays in Illumination Systems" Adv. Opt. Techn., vol. 1, 2012, pp. 69-78, pp. 1-14.

| dmddeltheta | -0.5 | -0.4 | -0.3 | -0.2 | -0.1 | 0 | 0.1 | 0.2 | 0.3 | 0.4 | 0.5 |
|---|---|---|---|---|---|---|---|---|---|---|---|
| farmirrortheta | 44.8766 | 44.9010 | 44.9256 | 44.9503 | 44.9751 | 45 | 45.0251 | 45.0503 | 45.0756 | 45.1011 | 45.1267 |
| nearmirrortheta | 44.6266 | 44.7010 | 44.7756 | 44.8503 | 44.9251 | 45 | 45.0751 | 45.1503 | 45.2256 | 45.3011 | 45.3767 |
| deltafocus (mm) | 0.0018 | 0.0012 | 0.0007 | 0.0003 | 0.0001 | 0 | 0.0001 | 0.0003 | 0.0007 | 0.0013 | 0.0020 |

PROJECTION SYSTEM AND METHOD WITH ADJUSTABLE ANGLE ILLUMINATION

CROSS-REFERENCE TO RELATED APPLICATIONS

This application claims the benefit of priority from U.S. Provisional Application No. 63/014,239, filed on 23 Apr. 2020, and European Patent Application No. 20171002.7, filed on 23 Apr. 2020, which are hereby incorporated by reference.

BACKGROUND OF THE INVENTION

1. Field of the Disclosure

This application relates generally to projection systems and methods of driving a projection system.

2. Description of Related Art

Digital projection systems typically utilize a light source and an optical system to project an image onto a surface or screen. The optical system includes components such as mirrors, lenses, waveguides, optical fibers, beam splitters, diffusers, spatial light modulators (SLMs), and the like. The contrast of a projector indicates the brightest output of the projector relative to the darkest output of the projector. Contrast ratio is a quantifiable measure of contrast, defined as a ratio of the luminance of the projector's brightest output to the luminance of the projector's darkest output. This definition of contrast ratio is also referred to as "static" or "native" contrast ratio.

Some projection systems are based on SLMs that implement a spatial amplitude modulation. In such a system, the light source may provide a light field that embodies the brightest level that can be reproduced on the image, and light is attenuated or discarded in order to create the desired scene levels. Some high contrast examples of projection systems based on this architecture use a semi-collimated illumination system and Fourier stop in the projection optics to improve contrast. In such architectures, the illumination angle on the SLM has a substantial effect on the projected image, including but not limited to effects on the contrast ratio and the clarity of the projected image.

BRIEF SUMMARY OF THE INVENTION

Various aspects of the present disclosure relate to devices, systems, and methods for projection display a high-contrast projection architecture.

In one exemplary aspect of the present disclosure, there is provided a projection system comprising a light source configured to emit a light in response to an image data; an illumination optical system configured to steer the light, the illumination optical system including a first mirror and a second mirror; a digital micromirror device including a plurality of micromirrors, wherein a respective micromirror is configured to reflect the steered light to a filter as on-state light in a case where the respective micromirror is in an on position and to reflect the steered light to a light dump as off-state light in a case where the respective micromirror is in an off position; and a controller configured to: determine a deviation between an actual angle of orientation of the digital micromirror device and an expected angle of orientation of the digital micromirror device, calculate a first amount of angle adjustment corresponding to the first mirror and a second amount of angle adjustment corresponding to the second mirror, and actuate the first mirror according to the first amount and the second mirror according to the second amount, thereby to maintain a position and a focus of the steered light on the digital micromirror device and to cause the on-state light to be incident within a predetermined distance from a center of the filter.

In another exemplary aspect of the present disclosure, there is provided a method of calibrating a projection system including a light source configured to emit a light in response to an image data, an illumination optical system configured to steer the light, the illumination optical system including a first mirror and a second mirror, and a digital micromirror device including a plurality of micromirrors respectively configured to reflect the steered light to a filter as on-state light in a case where the respective micromirror is in an on position and to reflect the steered light to a light dump as off-state light in a case where the respective micromirror is in an off position, the method comprising: determining a deviation between an actual angle of orientation of the digital micromirror device and an expected angle of orientation of the digital micromirror device, calculating a first amount of angle adjustment corresponding to the first mirror and a second amount of angle adjustment corresponding to the second mirror, and actuating the first mirror according to the first amount and the second mirror according to the second amount, thereby to maintain a position and a focus of the steered light on the digital micromirror device and to cause the on-state light to be incident within a predetermined distance from a center of the filter.

In another exemplary aspect of the present disclosure, there is provided a non-transitory computer-readable medium storing instructions that, when executed by a processor of a projection device including a light source configured to emit a light in response to an image data, an illumination optical system configured to steer the light, the illumination optical system including a first mirror and a second mirror, and a digital micromirror device including a plurality of micromirrors respectively configured to reflect the steered light to a filter as on-state light in a case where the respective micromirror is in an on position and to reflect the steered light to a light dump as off-state light in a case where the respective micromirror is in an off position, cause the projection device to perform operations comprising determining a deviation between an actual angle of orientation of the digital micromirror device and an expected angle of orientation of the digital micromirror device, calculating a first amount of angle adjustment corresponding to the first mirror and a second amount of angle adjustment corresponding to the second mirror, and actuating the first mirror according to the first amount and the second mirror according to the second amount, thereby to maintain a position and a focus of the steered light on the digital micromirror device and to cause the on-state light to be incident within a predetermined distance from a center of the filter.

In this manner, various aspects of the present disclosure provide for the display of images having a high dynamic range and high resolution, and effect improvements in at least the technical fields of image projection, holography, signal processing, and the like.

DESCRIPTION OF THE DRAWINGS

These and other more detailed and specific features of various embodiments are more fully disclosed in the following description, reference being had to the accompanying drawings, in which.

DETAILED DESCRIPTION OF THE INVENTION

Figure 1:
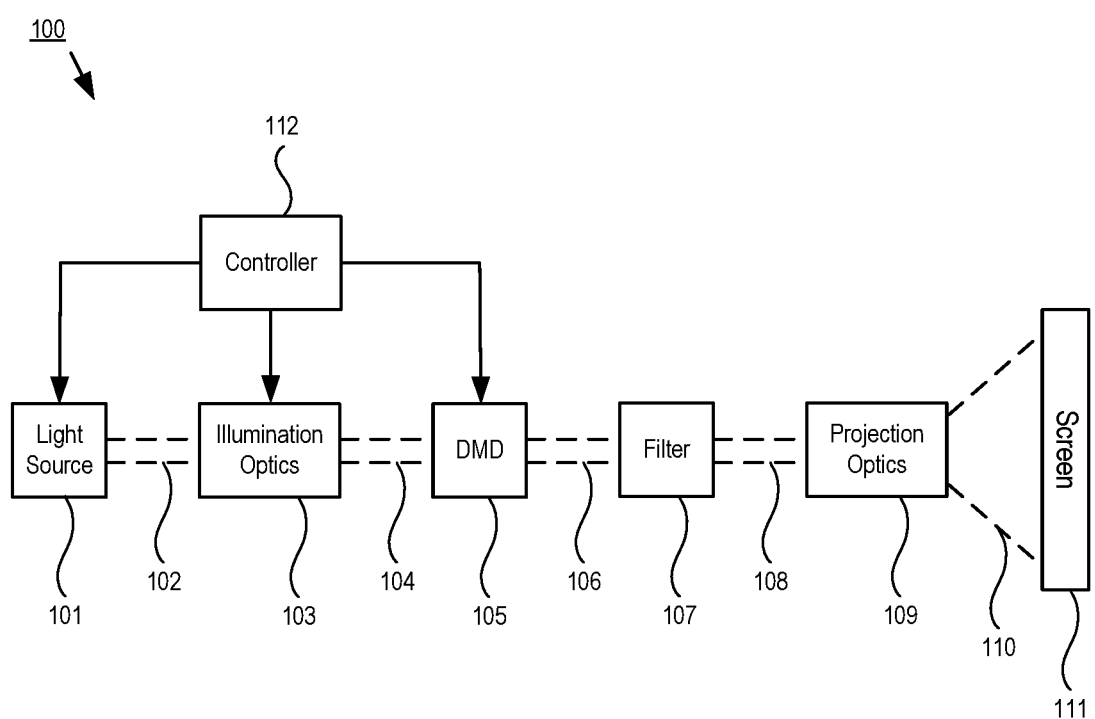
FIG. 1 illustrates a block diagram of an exemplary projection system according to various aspects of the present disclosure.

This disclosure and aspects thereof can be embodied in various forms, including hardware, devices, or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing summary is intended solely to give a general idea of various aspects of the present disclosure, and does not limit the scope of the disclosure in any way.

In the following description, numerous details are set forth, such as optical device configurations, timings, operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various circuits are used in digital projection systems, it will be understood that this is merely one example of an implementation. It will further be understood that the disclosed systems and methods can be used in any device in which there is a need to project light; for example, cinema, consumer and other commercial projection systems, heads-up displays, virtual reality displays, and the like.

Projector Systems

The optics of an SLM-based projection system may be broadly categorized into two parts: the optics located on the illumination side (i.e., optically upstream of the SLM) and the optics located on the projection side (i.e., optically downstream of the SLM). The SLM itself includes a plurality of modulating elements arranged in, for example, a two-dimensional array. Individual modulating elements receive light from the illumination optics and convey light to the projection optics. In some examples, the SLM may be implemented as a digital micromirror device (DMD); this will be discussed in more detail below. Generally, however, a DMD includes a two-dimensional array of reflective elements (micromirrors or simply "mirrors") which selectively reflect light towards the projection optics or discard light based on the position of the individual reflective elements.

As noted above, a high contrast projection system which uses a semi-collimated illumination system and Fourier stop in the projection optics may be greatly affected by differences in the angle of incidence light on the DMD. To prevent degradation in the projected image, a projection system may maintain the position and focus of an output of the illumination optics (e.g., light output from an integrating rod or other uniformity correcting device and subsequently reflected by one or more reflective elements) on the DMD, while at the same time keeping the reflected beam centered in the input of the projection optics (e.g., a filter aperture). However, the exact position of the first and second angle of the DMD mirrors may be subject to manufacturing or other tolerances, such that the actual first and second angles may vary by some amount. In order to compensate for differences in DMD mirror angle between different physical DMDs and ensure that the beam is appropriately centered, one may control the angle of light exiting (e.g., reflecting from) the DMD. Such control should be robust to variations in the first and second angle of the DMD mirrors. The robustness against angle variations may be provided by implementing an adjustment of the angle of incidence of the beam onto the DMD so that, when reflected by the DMD mirrors, the exit beam is always at (or substantially at) the nominal designed exit angle to the aperture. Moreover, because each color channel in color projection systems may have a different angle requirement, it is desirable to provide an adjustment for each color.

The architecture of such high contrast projection systems may provide particular constraints in addition to the adjustment and maintenance of proper illumination angle. For example, the projection systems may utilize a prism where the three colors are recombined and/or a fold mirror before the prism to reduce the size footprint of the optics and the projector itself. Moreover, because the illumination optics focuses an aperture onto the DMD, the optics may be constrained to maintain a constant distance between the aperture and the DMD. Furthermore, as noted above, the image of the aperture must be centered on the DMD. Herein, examples of projection systems are described which are capable of adjusting the input angle to the DMD without changing the focus or position of the integrating rod (or other uniformity correcting device) at the DMD.

FIG. 1 illustrates an exemplary high contrast projection system 100 according to various aspects of the present disclosure. In particular, FIG. 1 illustrates a projection system 100 which includes a light source 101 configured to emit a first light 102; illumination optics 103 (one example of an illumination optical system in accordance with the present disclosure) configured to receive the first light 102 and redirect or otherwise modify it, thereby to generate a second light 104; a DMD 105 configured to receive the second light 104 and selectively redirect and/or modulate it as a third light 106; a filter 107 configured to filter the third light 106, thereby to generate a fourth light 108; and projection optics 109 configured to receive the fourth light 108 and project it as a fifth light 110 onto a screen 111.

In practical implementations, the projection system 100 may include fewer optical components or may include additional optical components such as mirrors, lenses, waveguides, optical fibers, beam splitters, diffusers, and the like. With the exception of the screen 111, the components illustrated in FIG. 1 may be integrated into a housing to provide a projection device. Such a projection device may include additional components such as a memory, input/output ports, communication circuitry, a power supply, and the like.

The light source 101 may be, for example, a laser light source, an LED, and the like. Generally, the light source 101 is any light emitter which emits coherent light. In some aspects of the present disclosure, the light source 101 may comprise multiple individual light emitters, each corresponding to a different wavelength or wavelength band. The light source 101 emits light in response to an image signal provided by the controller 112; for example, one or more processors such as a central processing unit (CPU) of the projection system 100. The image signal includes image data corresponding to a plurality of frames to be successively displayed. Individual elements in the projector system 100, including the illumination optics 103 and/or the DMD 105, may be controlled by the controller 112. The image signal may originate from an external source in a streaming or cloud-based manner, may originate from an internal memory of the projection system 100 such as a hard disk, may originate from a removable medium that is operatively connected to the projection system 100, or combinations thereof.

Although FIG. 1 illustrates a generally linear optical path, in practice the optical path is generally more complex. For example, in the projection system 100, the second light 104 from the illumination optics 103 is steered to the DMD chip 105 (or chips) at a fixed angle, determined by the steering angle of the DMD mirrors.

Figure 2A:
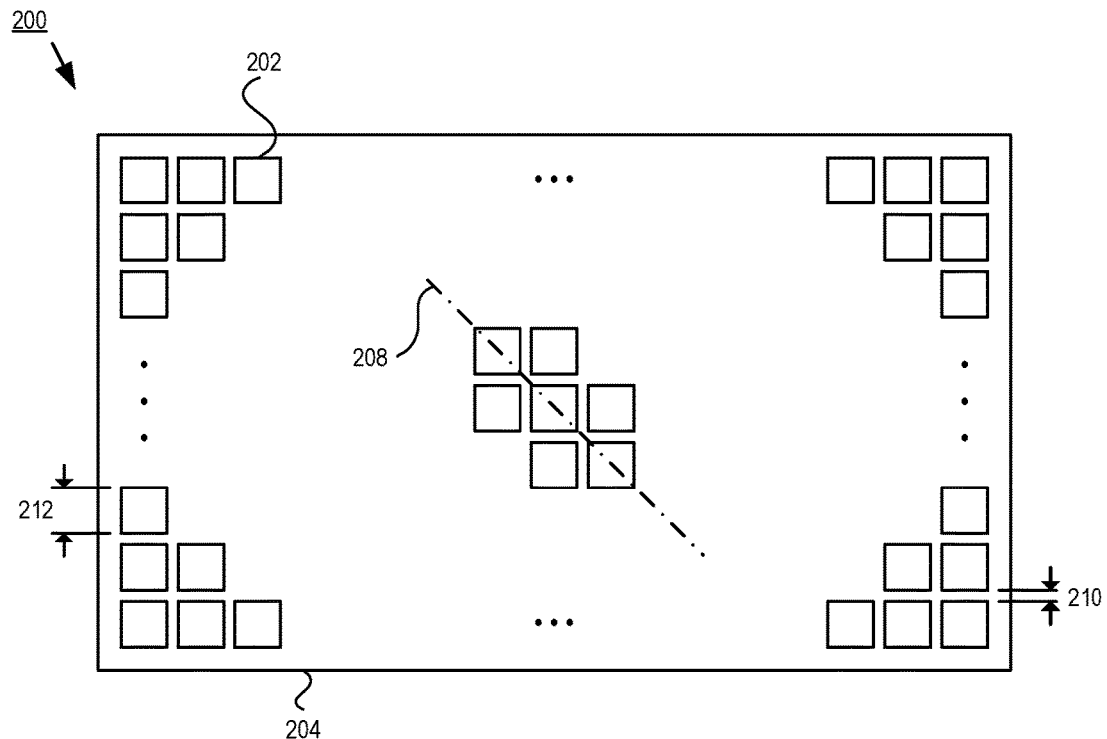
FIGS. 2A-2B illustrate views of an exemplary spatial light modulator for use with various aspects of the present disclosure.
Figure 2B:
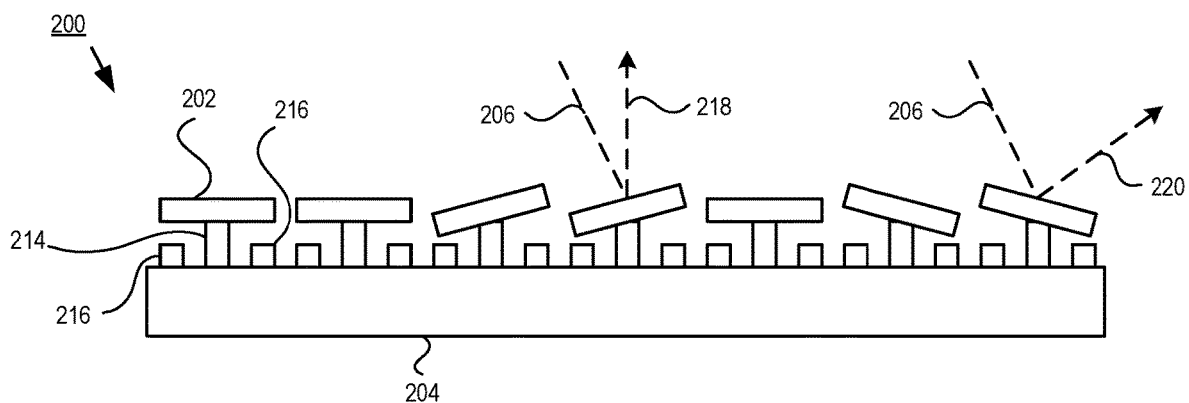

To illustrate the effects of the angle of incidence and the DMD mirrors, FIGS. 2A-2B show an exemplary DMD 200 in accordance with various aspects of the present disclosure. FIG. 2A illustrates a plan view of the DMD 200, and FIG. 2B illustrates partial cross-sectional view of the DMD 200. The DMD 200 includes a plurality of square micromirrors 202 arranged in a two-dimensional rectangular array on a substrate 204. In some examples, the DMD 200 may be a digital light processor (DLP) from Texas Instruments. Each micromirror 202 may correspond to one pixel of the eventual projection image, and may be configured to tilt about a rotation axis 208, shown for one particular subset of the micromirrors 202, by electrostatic or other actuation. The individual micromirrors 202 have a width 212 and are arranged with gaps of width 210 therebetween. The micromirrors 202 may be formed of or coated with any highly reflective material, such as aluminum or silver, to thereby specularly reflect light. The gaps between the micromirrors 202 may be absorptive, such that input light which enters a gap is absorbed by the substrate 204.

While FIG. 2A expressly shows only some representative micromirrors 202, in practice the DMD 200 may include many more individual micromirrors in an number equal to a resolution of the projector system 100. In some examples, the resolution may be 2K (2048×1080), 4K (4096×2160), 1080p (1920×1080), consumer 4K (3840×2160), and the like. Moreover, in some examples the micromirrors 202 may be rectangular and arranged in the rectangular array; hexagonal and arranged in a hexagonal array, and the like. Moreover, while FIG. 2A illustrates the rotation axis 208 extending in an oblique direction, in some implementations the rotation axis 208 may extend vertically or horizontally.

As can be seen in FIG. 2B, each micromirror 202 may be connected to the substrate 204 by a yoke 214, which is rotatably connected to the micromirror 202. The substrate 204 includes a plurality of electrodes 216. While only two electrodes 216 per micromirror 202 are visible in the cross-sectional view of FIG. 2B, each micromirror 202 may in practice include additional electrodes. While not particularly illustrated in FIG. 2B, the DMD 200 may further include spacer layers, support layers, hinge components to control the height or orientation of the micromirror 202, and the like. The substrate 204 may include electronic circuitry associated with the DMD 200, such as CMOS transistors, memory elements, and the like.

Depending on the particular operation and control of the electrodes 216, the individual micromirrors 202 may be switched between an "on" position, an "off" position, and an unactuated or neutral position. If a micromirror 202 is in the on position, it is actuated to an angle of (for example) −12° (that is, rotated counterclockwise by 12° relative to the neutral position) to specularly reflect input light 206 into on-state light 218. If a micromirror 202 is in the off position, it is actuated to an angle of (for example) +12° (that is, rotated clockwise by 12° relative to the neutral position) to specularly reflect the input light 206 into off-state light 220. The off-state light 220 may be directed toward a light dump that absorbs the off-state light 220. In some instances, a micromirror 202 may be unactuated and lie parallel to the substrate 204. The particular angles illustrated in FIGS. 2A-2B and described here are merely exemplary and not limiting. In some implementations, the on- and off-position angles may be between ±12 and ±13 degrees (inclusive), respectively.

In the context of FIG. 1, where the DMD mirrors use an angle tilt of 12° to reflect or discard light, the second light 104 is steered to the DMD chip 105 at a fixed angle of 24°. When an individual mirror is tilted at a first predetermined angle (e.g., −12°), the mirror is considered to be in the on state and redirects light toward the filter 107 and the projection optics 109. When an individual mirror is tilted at a second predetermined angle (e.g., +12°), the mirror is considered to be in the off state and redirects light to a light dump located outside the active image area.

In order to ensure that the image on the screen 111 has an acceptable clarity and contrast ratio, the illumination optics may be designed and/or controlled to ensure that the angle of incidence on the DMD 105 is correct, that aperture focus is maintained, and that aperture location is maintained, regardless of the presence of the prism and fold mirror in the projection system 100.

Dual Mirror Alignment Control System

Figure 3A:
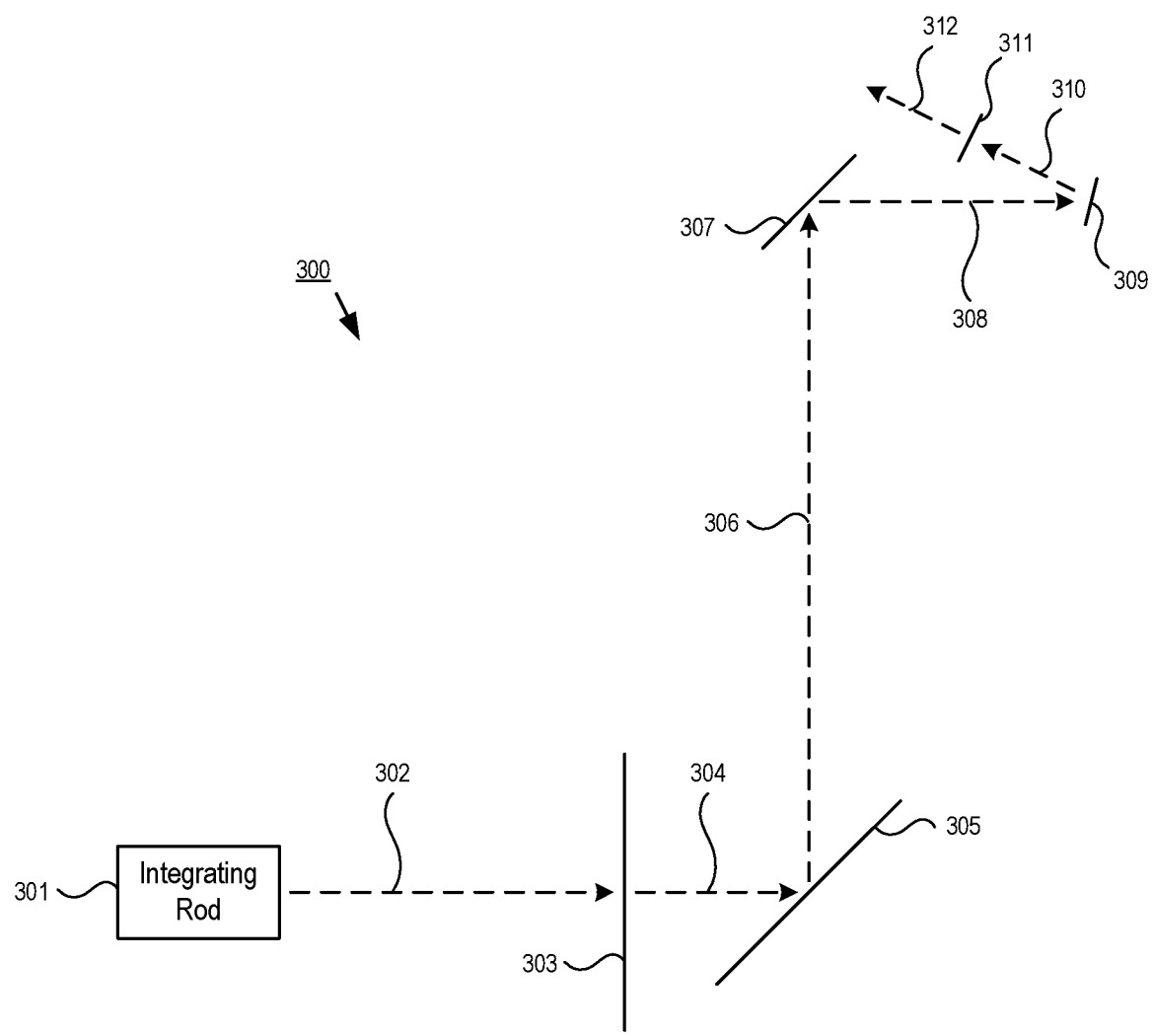
FIGS. 3A-3B illustrate exemplary optical states in an exemplary projection system according to various aspects of the present disclosure.
Figure 3B:
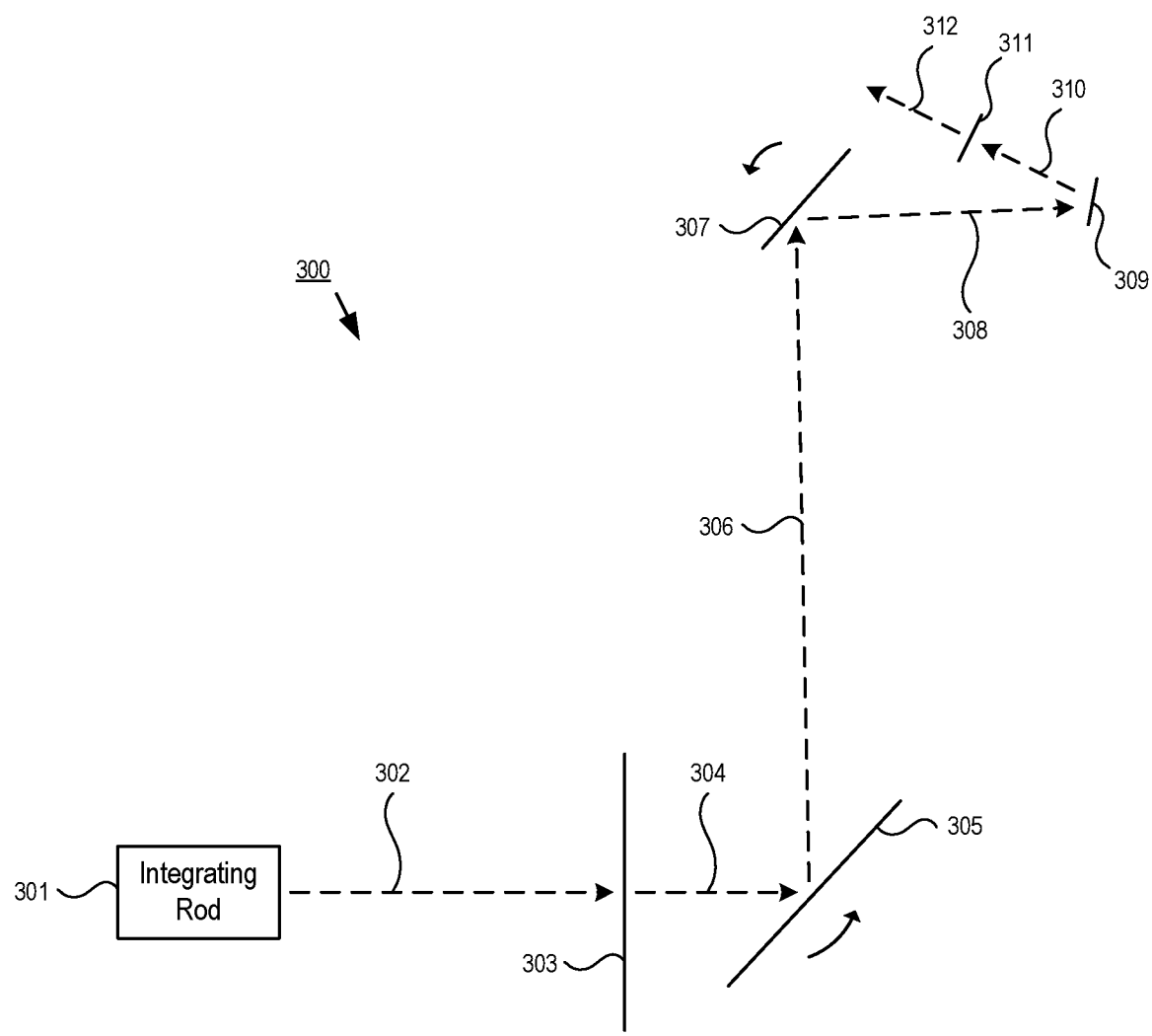

In one exemplary implementation of the present disclosure, the above may be realized by using two mirrors located in series. FIGS. 3A-3B illustrate exemplary optical states of a partial optical system 300 in accordance with the present disclosure.

In particular, FIGS. 3A-3B illustrate an integrating rod 301, a first light 302, an illumination lens system 303 (which may comprise one or more individual lenses), a second light 304, a first mirror 305, a third light 306, a second mirror 307, a fourth light 308, a DMD 309, a fifth light 310, an aperture 311, and a sixth light 312. Both the first mirror 305 and the second mirror 307 are configured for angle adjustment. Because the first mirror 305 is located optically upstream (and thus farther from the DMD) compared to the second mirror 307, when the first mirror 305 changes its angle the location of the third light 306 on the second mirror 307 moves. In this manner, the first mirror 305 is configured to provide mostly translation (i.e., an effective translation function) and the second mirror 307 is configured to provide mostly angle adjustment. For explanation purposes, the partial optical system 300 in FIGS. 3A-3B is illustrated in an orientation where the first light 302 travels generally horizontally. Various elements illustrated in FIGS. 3A-3B may correspond to various elements (or parts of various elements) illustrated in FIG. 1.

In some examples, the integrating rod 301 may be a component of the light source 101 which receives light from a light emitting element of the light source 101 and outputs light, such that the first light 302 corresponds to the first light 102. In other examples, the integrating rod 301 may be a component of the illumination optics 103, such that the integrating rod 301 receives the first light 102 and integrates it to form the first light 302. In some examples, the illumination lens system 303, the first mirror 305, and the second mirror 307 are components of the illumination optics 103, such that the fourth light 308 corresponds to the second light 104. The first mirror 305 and/or the second mirror 307 may be formed of or coated with any highly reflective material, such as aluminum or silver, to thereby specularly reflect light.

The DMD 309 may correspond to the DMD 105. For ease of explanation, the DMD 309 is illustrated as a flat surface; however, in practice the DMD 309 includes a plurality of individual reflective elements that may or may not be oriented along the same plane. In this manner, the DMD 309 may have a structure as illustrated in FIGS. 2A-2B so as to selectively reflect and direct the fourth light 308 (i.e., the second light 104) depending on whether individual reflective components of the DMD 309 are in the on position, the off position, or the neutral position. Thus, the fifth light 310 may correspond to the third light 106. In some examples, the aperture 311 may be a component of the filter 107 thereby to provide filtered illumination to the projection optics, which are not illustrated in FIGS. 3A-3B. In order to provide an appropriate contrast ratio and image clarity, the fifth light 310 should be centered on the aperture 311.

In the state illustrated in FIG. 3A, the surface of the DMD 309 is oriented at an angle of 12.5° (measured from the vertical). In order to ensure that the fifth light 310 is centered on the aperture 311, then, the first mirror 305 and the second mirror 307 are each oriented at an angle of 45°. The first light 302 travels along a horizontal optical axis from the integrating rod 301 to the illumination lens system 303. In practice, the first light 302 expands as it travels, such that it subtends a non-zero solid angle at a surface of the illumination lens system 303. The illumination lens system 303 is configured to image the first light 302 onto the DMD 309, such that the second light 304 is focused on a virtual point that is the same optical distance from an exit of the illumination lens system 303 as the DMD 309. In other words, the focus of the illumination lens system 303 is located at a distance substantially equal to the sum of the optical path distances of the second light 304, the third light 306, and the fourth light 308.

The second light 304 is specularly reflected by the first mirror 305, such that the third light 306 travels vertically toward the second mirror 307. The third light 306 is specularly reflected by the second mirror 307, such that the fourth light 308 travels horizontally toward the DMD 309, where it is reflected as the fifth light 310 toward the center of the aperture 311.

In practice, however, any deviation in the angle of orientation of the DMD 309 will result in a shift in the point of incidence of the fifth light 310 on the aperture 311. This shift may be counteracted by adjusting the first mirror 305 and the second mirror 307. FIG. 3B illustrates such a countermeasure.

In the state illustrated in FIG. 3B, the surface of the DMD 309 is oriented at an angle of 10.5° (measured from the vertical), which is a 2° difference from the state illustrated in FIG. 3A. This angle difference is provided for ease of explanation in the visualization; in practical implementations, manufacturing and other tolerances in the DMD 309 may result in angle differences on the order of 0.5° or less. In order to accommodate a change in the orientation of the DMD 309, the input angle of the fourth light 308 to the DMD 309 may be changed. This may be effected by adjusting the first mirror 305 and the second mirror 307 appropriately.

The adjustments are such that the first mirror 305 is tilted to move the beam to the left. In the particular example illustrated in FIG. 3B, the first mirror 305 is provided with a 0.5° counterclockwise tilt adjustment relative to the position in FIG. 3A. The second mirror 307 is tilted to move the beam up, which corresponds to a 1.5° counterclockwise tilt adjustment relative to the position in FIG. 3A. Together, these tilt adjustments accommodate for the orientation deviation in the DMD 309, such that the fifth light 310 remains centered on the aperture 310. The first mirror 305 and the second mirror 307 may be actuated by, for example, servo motors.

The adjustments to the first mirror 305 and the second mirror 307 may be made during a calibration of the projection system 100. The calibration may occur in real-time (e.g., after installation of the projection system 100 and before or during image projection) or during manufacture.

Dual Mirror Alignment Method

Figures 4, 5A:
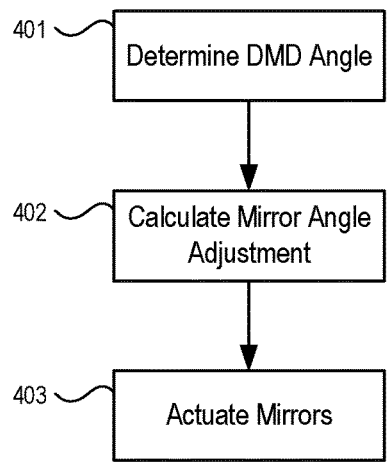
FIG. 4 illustrates an exemplary alignment method in the exemplary optical system of FIGS. 3A-3B.
FIGS. 5A-5B illustrate an exemplary relationship between mirror angles in the exemplary optical system of FIGS. 3A-3B.

FIG. 4 illustrates an exemplary alignment method, which may be performed during the calibration of the partial optical system 300 illustrated in FIGS. 3A-3B. The alignment method of FIG. 4 may be performed in an automated manner; for example, through a computer program as will be described in more detail below.

At operation 401, the alignment method determines an angle of orientation, or a deviation in the angle of orientation from the expected angle, of the DMD 309. The angle of orientation may be determined directly by, for example, physically measuring the angle of orientation of the DMD 309 in the projection system 100. Additionally or alternatively, the angle of orientation may be determined indirectly by, for example, illuminating the DMD 309 at a known angle and measuring the output angle of reflected light. In some implementations, operation 401 may be performed in a test fixture before the DMD 309 is installed on its prism assembly.

At operation 402, the alignment method calculates the appropriate amount of angle adjustments for the first mirror 305 and the second mirror 307, based on the measured angle of orientation (or deviation) of the DMD 309. The appropriate amount of angle adjustments may be the amount which causes the fifth light 310 to be centered on the aperture 310. The calculations of operation 402 may be performed through the use of a computer program that receives a single input (the angle of orientation of the DMD 309, or the angle of orientation of the DMD 309 relative to the expected angle) and outputs angles of orientation for the first mirror 305 and the second mirror 307. An exemplary calculation process, which takes as an input the difference between the angle of orientation of the DMD 309 and the expected angle ("dmddeltheta"), as depicted in Table 1 in a MATLAB-like pseudocode format to perform ray tracing.

TABLE 1

```
dmddeltheta = -0.5:0.1:0.5; %degrees
dmdmd = 100; %distance from mirror to DMD (dmd mirror distance)
mirrortheta = 45; %degrees for nominal 0 degree DMD delta angle, near mirror
m2theta = 45;   %degrees for nominal 0 degree DMD delta angle, far mirror
mrad = mirrortheta*pi/180;
mmd = 200;   %distance between two mirrors in mm
%calculate interception and distances on mirror
dfm = dmdmd*sin(dmddeltheta*pi/180);
%use AAS and law of sines to determine location on mirror
Ctheta = 90 + dmddeltheta;   %mirror triangle angle C
Atheta = 90 - mirrortheta;   %mirror triangle angle A at near mirror loc
Btheta = 180 - Ctheta - Atheta; %mirror triangle B at far mirror loc
Crad = Ctheta*pi/180;
Brad = Btheta*pi/180;
Arad = Atheta*pi/180;
B = dfm;
C = B.*sin(Crad)./sin(Brad);
A = B.*sin(Arad)./sin(Brad);   %delta distance on ray path
mpointx = -C.*cos(mrad);   %x location from center of mirror
mpointy = -C.*sin(mrad);   %y location from center of mirror
%Use xy location to calculate required angle tilt.
mmd2 = sqrt(mpointx.^2 + (mmd + mpointy).^2); %ray distance between mirrors
mrad2del = atan(mpointx./(mmd + mpointy)); %delta angle from mirror to mirror
mtheta2del = 0.5*mrad2del*180/pi;   %required mirror delta angle in degrees
m2thetanew = m2theta - mtheta2del;
mirrortheta2 = mirrortheta - mtheta2del + dmddeltheta/2;
%print out to console
farmirrortheta = m2thetanew
nearmirrortheta = mirrortheta2
%ray distance minus nominal ray distance = focus point change
deltafocus = (A + mmd2 + dmdmd) - dmdmd - mmd
```

Figure 5B:
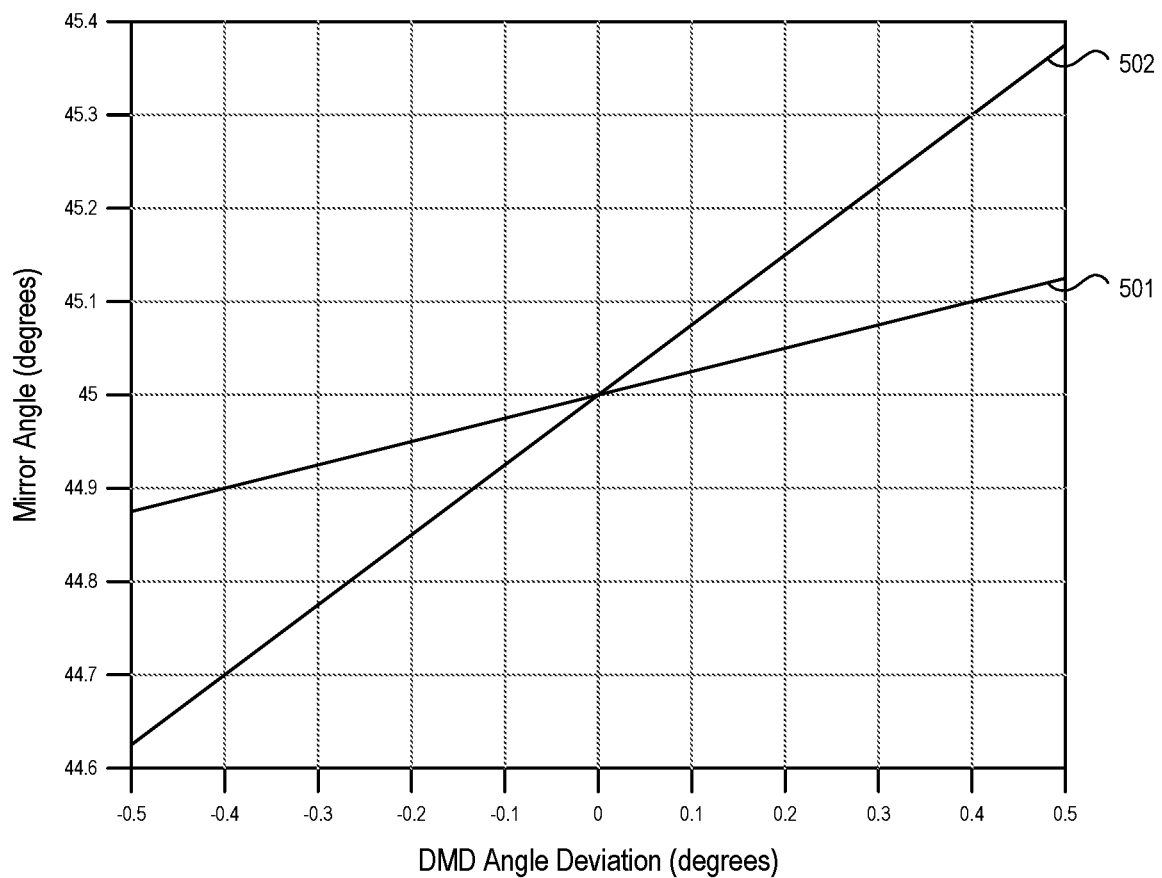

The calculations of Table 1 output the adjusted angle of orientation of the first mirror 305 ("farmirrortheta"), the adjusted angle of orientation of the second mirror 307 ("nearmirrortheta), and the change in the focus point ("deltafocus"). The change in the focus point may result in some degree of defocus; however, depending on the f-number of the projection system 100, the change in the focus point may not be detectable. The input and outputs of the calculations of Table 1 are depicted in FIG. 5A. Moreover, FIG. 5B illustrates the quantities farmirrortheta (501) and nearmirrortheta (502) as a function of dmdtheta. While FIGS. 5A-5B illustrate an example in which the magnitude of farmirrortheta is between zero and 0.1267 degrees and the magnitude of nearmirrortheta is between zero and 0.3737 degrees, the present disclosure is not so limited. In some examples (and depending on the relative locations of the first mirror 305 and the second mirror 307), the magnitude of farmirrortheta may be between zero and 0.2 degrees and the magnitude of nearmirrortheta may be between zero and 0.6 degrees.

As can be seen from FIG. 5A, any changes to the focus point of the system are small (2 μm or less). Shifts in the focus point may not become apparent until the change exceeds ~20 μm depending on the system parameters, and generally are more apparent for projection systems having a small f-number. In some implementations, the projection system 100 has an f-number of f15 or higher. In such implementations, the effects on the focal point of the system 100 are not detectable. If, however, the projection system 100 has a very small f-number, in one example at least one of the first mirror 305 or the second mirror 307 should translate in addition to its rotation. In another example, the position of the illumination lens system 303 along the optical axis of the first light 302 may be adjusted to maintain the focus.

The calculations of operation 402 may be carried out at a time of calibration, or may be performed beforehand and stored in a lookup table associated with the projection system 100. In such an implementation, the calibration method may calculate the appropriate mirror angle adjustment by referencing the lookup table instead of by performing the operations illustrated in Table 1.

After the above calculations of operation 402, the alignment method actuates the mirrors at operation 403 to impart the calculated orientation thereon. This actuation may be implemented using a stepper motor, servo motor, or other appropriate adjustment mechanism. In some examples, the actuation is performed under the control of the controller 112 of FIG. 1. In other examples, the actuation is performed under manual control.

Mechanical Pivot Alignment Control System

While FIGS. 3A-5B illustrate a dual mirror implementation of the projection system 100, the present disclosure is not so limited. In another exemplary implementation of the present disclosure, the above may be realized by using a single mirror and by adjusting both the angle of the mirror and its position.

In such any implementation, changes to the position of the mirror will result in changes to the focus of the aperture. As such, the illumination optics 103 should be refocused for each angle adjustment. However, the focus adjustment also results in small changes to the appropriate position of the mirror, such that multiple adjustments may be implemented to achieve the proper combination of focus, position, and angle.

Figure 6:
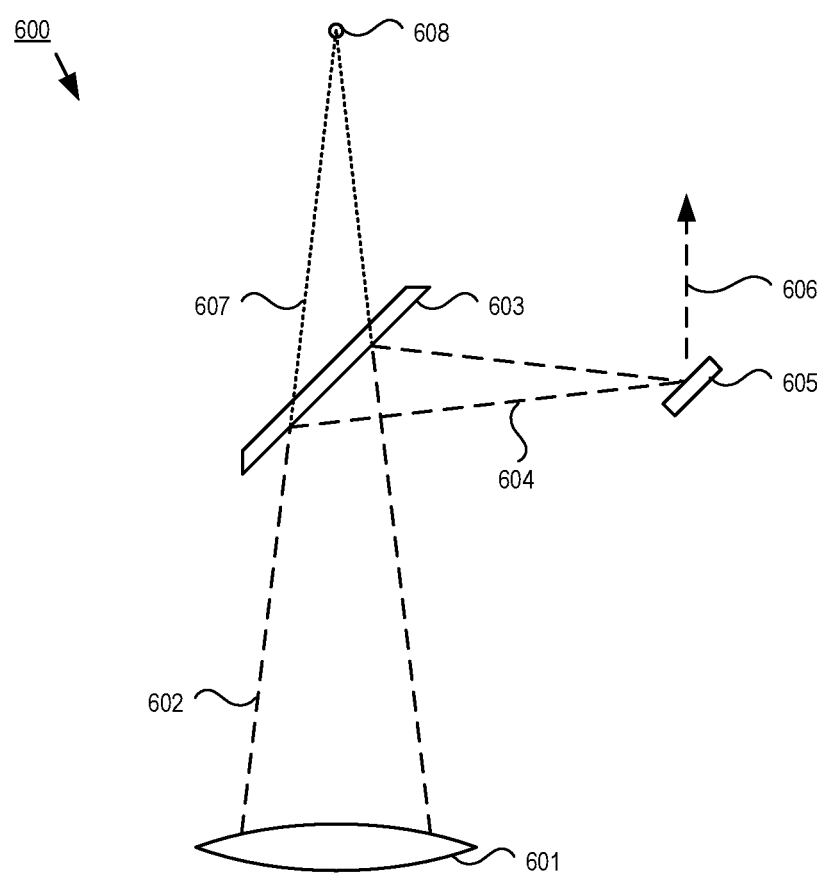
FIG. 6 illustrates an exemplary optical state in another exemplary projection system according to various aspects of the present disclosure.

FIG. 6 illustrates a partial optical system 600 in accordance with the present disclosure. In particular, FIG. 6 illustrates an illumination lens system 601 (which may comprise one or more individual lenses), a first light 602, a mirror 603, a second light 604, a DMD 605, a third light 606, a virtual light path 607, and a virtual pivot point 608. For explanation purposes, the partial optical system 600 in FIG.

6 is illustrated in an orientation where the first light 602 travels generally vertically. Various elements illustrated in FIG. 6 may correspond to various elements (or parts of various elements) illustrated in FIG. 1.

In some components, the illumination lens system 601 may be a component of the illumination optics 103 which receives either the first light 102 or intermediate light from upstream optical components within the illumination optics 103. The illumination lens system 601 conveys the received light as the first light 602 to the mirror 603, which may be formed of or coated with any highly reflective material, such as aluminum or silver, to thereby specularly reflect the first light 602 as the second light 604.

The DMD 605 may correspond to the DMD 105. For ease of explanation, the DMD 605 is illustrated as a flat surface; however, in practice the DMD 605 includes a plurality of individual reflective elements that may or may not be oriented along the same plane. In this manner, the DMD 605 may have a structure as illustrated in FIGS. 2A-2B so as to selectively reflect and direct the second light 604 depending on whether individual reflective components of the DMD 605 are in the on position, the off position, or the neutral position. Thus, the third light 606 may correspond to the third light 106, and may be directed to and centered on downstream components so as to provide an appropriate contrast ratio and image clarity.

In a comparative example, if no mirror were present and thus an optical path from the illumination optics goes directly from the illumination aperture to the DMD at the correct angle and with the correct focus, and the system had a configuration in which the components had a single axis pivot point located at the center of a surface of the DMD, then the angle of the illumination could be adjusted without affecting the position or focus of the aperture image. However, this comparative example is not practical in a configuration including mirrors (such as a fold mirror or total internal reflection in a prism). Therefore, to recreate the effects of such a pivot, FIG. 6 further illustrates a virtual pivot simulation.

In FIG. 6, because the individual reflective elements of the DMD 605 pivot on a single axis and because a sufficient contrast ratio and projected image clarity relies on a correction of different mirror pivot angles, then the optical path of light incident on the DMD 605 similarly may only pivot about the same single axis. To illustrate this, FIG. 6 further shows a virtual light path 607 and a virtual pivot point 608. The virtual light path 607 traces the trajectory of the first light 602 if the mirror 603 were not present. The virtual pivot point 608 represents, but is not physically located on, the DMD 605 surface. While FIG. 6 illustrates an example in which only one reflective element exists in the optical path, the virtual pivot point 608 may be found even in systems with multiple reflective elements (e.g., mirrors, total internal reflection prisms, and so on) by unfolding all of the reflections (e.g., by determining and utilizing multiple virtual light paths). In any case, if the source of the first light 602 (e.g., the illumination lens system 601) is rotated physically about the virtual pivot point, then the location and focus do not change when the angle of a reflective surface of the DMD 605 is adjusted. Mechanical linkages may be used to effect this rotation.

Figure 7:
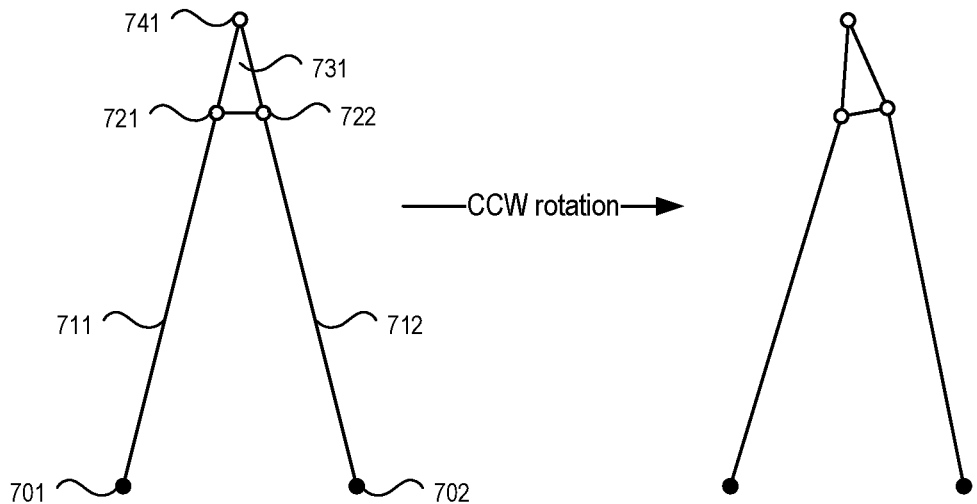
FIG. 7 illustrates an exemplary linkage for use with the exemplary optical system of FIG. 6.

FIG. 7 illustrates one exemplary mechanical linkage configuration. In FIG. 7 (and subsequent figures), filled circles represent connector hinges that have a fixed location, which may be referred to as hinges that are "tied to ground." Empty circles represent connector hinges which are free to translate. Thus, FIG. 7 illustrates a first fixed connector hinge 701, a second fixed connector hinge 702, a first connector 711 having a first end connected to the first fixed connector hinge 701, a second connector 712 having a first end connected to the second fixed connector hinge 702, a first free hinge 721 connected to a second end of the first connector 711, a second free hinge 722 connected to a second end of the second connector 712, a carrier body 731, and a pivot point 741 which may be coincident with a third free hinge. The first connector 711, the second connector 712, and the carrier body 731 are rigid bodies. In the left portion of FIG. 7, the carrier body 731 is in an unadjusted configuration. In such a configuration, the first connector 711 and the second connector 722 are pointed at the pivot point location. In the right portion of FIG. 7, the carrier body 731 has been given a counterclockwise rotation to provide the desired rotation and accommodate the orientation angle of the DMD 605.

The location of the pivot point 741 moves by only a small amount as a result of the counterclockwise rotation. The amount of change in the focus position depends on the respective lengths of the first connector 711 and the second connector 722, and the amount of change in the location of the pivot point depends on the particular geometry of the linkage implementation.

Figure 8:
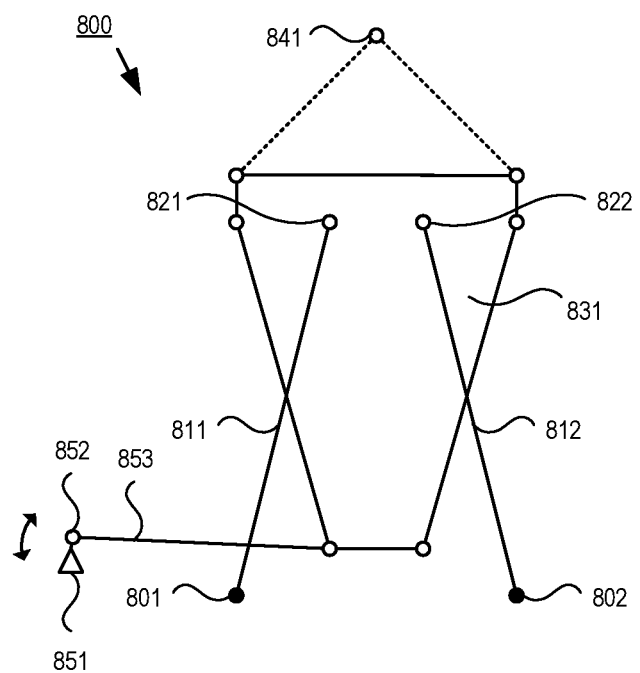
FIG. 8 illustrates another exemplary linkage for use with the exemplary optical system of FIG. 6.

FIG. 8 illustrates another exemplary linkage 800. FIG. 8 illustrates a first fixed connector hinge 801, a second fixed connector hinge 802, a first connector 811 having a first end connected to the first fixed connector hinge 801, a second connector 812 having a first end connected to the second fixed connector hinge 802, a first free hinge 821 connected to a second end of the first connector 811, a second free hinge 822 connected to a second end of the second connector 712, a carrier body 731, and a pivot point 841. The first connector 811, the second connector 812, and the carrier body 831 are rigid bodies. The carrier body 831 has a generally coffin-like shape; however, because the pivot point 841 should not be a part of the optical surface, in practice the uppermost portion of the carrier body 831 may be cut off (represented by the dotted line in FIG. 8). In one particular example, the optical path of a system including the exemplary linkage configuration of FIG. 8 has an optical path of about 500 mm, which is near the minimum practical length for D-Cinema DMD devices which are about 35 mm diagonal.

The linkage 800 of FIG. 8 is driven by a combination of a drive mechanism 851, a drive hinge 852, and a drive connector 853 which extends between the drive hinge 852 and a lower vertex of the carrier body 831. The action of the drive mechanism, conveyed to the carrier body 831 via the drive connector 853, provides the translation of the carrier body 831. Compared to the linkage illustrated in FIG. 7, the linkage 800 illustrated in FIG. 8 may result in an even smaller amount of change in the location of the pivot point 841. In one particular example, the rotation applied to accommodate for an angle shift of the optical path from 0 to 0.5° (e.g., as a result of a change in the angle of orientation of a reflective element of the DMD) may result in a translation of the pivot point of 0.06 µm. Such a translation would be undetectable. The position shift in the focus may be larger (e.g., ~13 µm), which is likely to be undetectable with optical systems having a f-number of f20 or f15. In any event, the nature and architecture of the DMD may themselves mitigate the effects of a focus change or confine the effects to the edges.

Figure 9A:
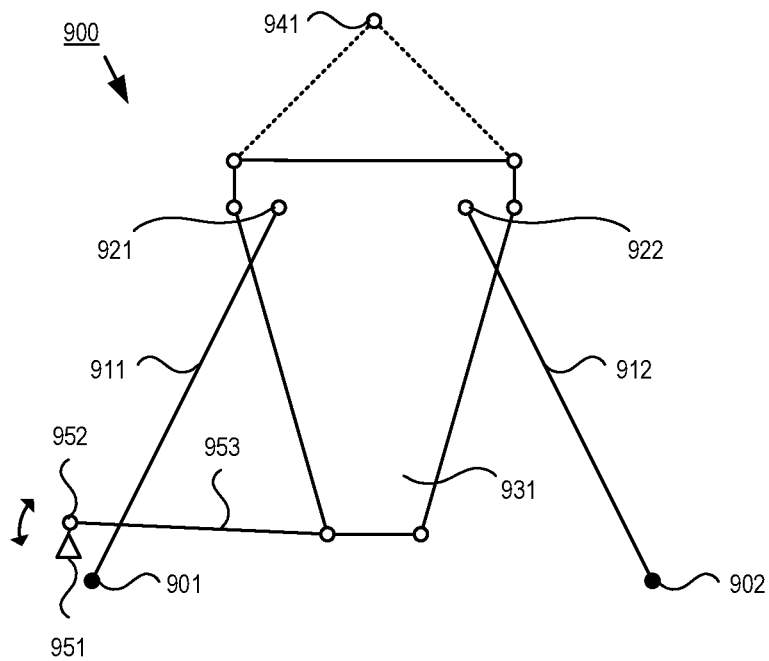
FIGS. 9A-9B illustrate exemplary optical states for another exemplary linkage for use with the exemplary optical system of FIG. 6.
Figure 9B:
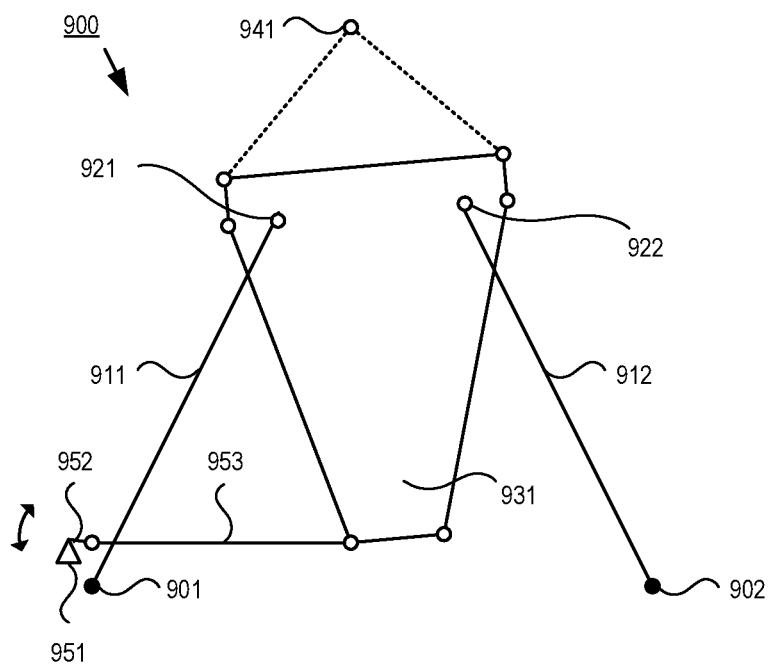

In practical implementations, the effects of play in the bearings (e.g., the bearings in various ones of the hinges illustrated in FIGS. 7-8) may themselves affect the position of the virtual pivot point. This, however, may be alleviated by modifying the geometry of the linkage such that the linkage is more tolerant of the bearing play. FIGS. 9A-9B illustrate one such example of such a geometry for a linkage 900.

FIGS. 9A-B illustrate a first fixed connector hinge 901, a second fixed connector hinge 902, a first connector 911 having a first end connected to the first fixed connector hinge 901, a second connector 912 having a first end connected to the second fixed connector hinge 902, a first free hinge 921 connected to a second end of the first connector 911, a second free hinge 922 connected to a second end of the second connector 912, a carrier body 931, and a pivot point 941. The first connector 911, the second connector 912, and the carrier body 931 are rigid bodies. The carrier body 931 has a generally coffin-like shape; however, because the pivot point 941 should not be a part of the optical surface, in practice the uppermost portion of the carrier body 931 may be cut off (represented by the dotted line in FIGS. 9A-B). FIG. 9A illustrates the linkage 900 in an unrotated position, and FIG. 9B illustrates the linkage 900 in a rotated position.

The linkage 900 is driven by a combination of a drive mechanism 951, a drive hinge 952, and a drive connector 953 which extends between the drive hinge 952 and a lower vertex of the carrier body 931. The action of the drive mechanism, conveyed to the carrier body 931 via the drive connector 953, provides the translation of the carrier body 931.

Compared to the linkage 800 of FIG. 8, the angle between the first and second connectors and (in FIGS. 9A-9B, the angle between the first connector 911 and the second connector 912) is larger. The increase in angle increases the tolerance to bearing play of the linkage 900 up to an angle of 45°, which is the particular angle between the first connector 911 and the second connector 912 illustrated in FIGS. 9A-9B. However, this change may result in slightly greater focal changes (e.g., 16 µm vs. 13 µm). In the event that this increase causes the change in focus to become noticeable, the lengths of the first connector 911 and the second connector 912 may be increased to compensate while the angle therebetween is maintained. The amount of increase in the lengths of the first connector 911 and the second connector 912 may be limited by the thermal expansion coefficient of the material of the first connector 911 and the second connector 912.

To further reduce the amount of bearing play in the linkage 900, it is possible to apply a preload to the bearings. In addition to an axial preload (e.g., with two bearings per pivot point), it is possible to add a spring that is attached to the bottom surface of the carrier body 931 at one end and attached to a fixed point (e.g., ground) at the other end. In some examples, the carrier body 931 is provided with a slot to allow a bolt (or other fastening mechanism) to lock the linkage 900 in place after adjustment. In some examples, the slot may be provided between the first connector 921 and the second connector 922 in a straight line.

In some implementations, the optical system 100 includes a linkage that has a coffin-like shape similar to the shape illustrated in FIGS. 8 and 9A-9B with an angle between the first and second connectors of between 10° and 40° and a length sufficient to maintain the required focus. In one particular example, the angle is 30° and the length is greater than or equal to 500 mm.

Figure 10:
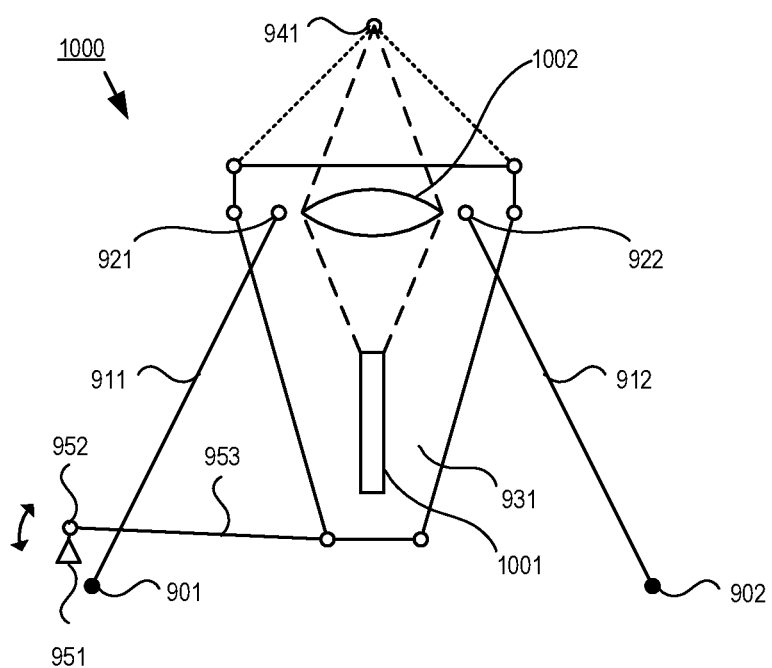
FIG. 10 illustrates an exemplary implementation of the exemplary optical system of FIG. 6.

Regardless of the particular linkage architecture used, various portions of the illumination optics 103, including but not limited to those elements illustrated in FIG. 6, may be mounted to the carrier body. FIG. 10 illustrates one such example of such a configuration using the linkage 900 of FIGS. 9A-9B. In FIG. 10, a partial optical system 1000 includes the linkage illustrated in FIG. 9, an integrating rod 1001, and an illumination lens system 1002 are mounted on the carrier body 931. In some examples, the integrating rod 1001 may be a component of the light source 101 which receives light from a light emitting element of the light source 101; however, in other examples, the integrating rod 1001 may be a component of the illumination optics 103. Other methods to create a uniform illumination such as a fly's eye assembly may be used in place of the integrating rod.

The adjustments to the linkage to compensate for deviations in the angle of the DMD 605 may be made during a calibration of the projection system 100. The calibration may occur in real-time (e.g., after installation of the projection system 100 and before or during image projection) or during manufacture.

Mechanical Pivot Alignment Method

Figure 11:
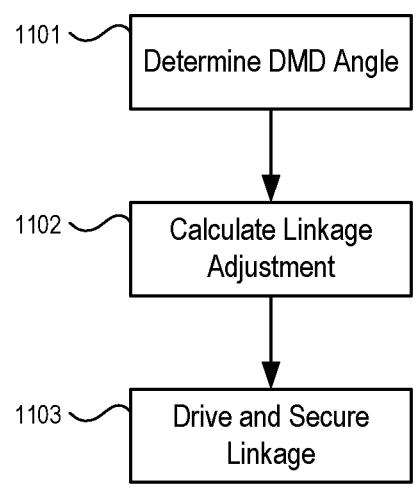
FIG. 11 illustrates an exemplary alignment method in the exemplary optical system of FIG. 6.

FIG. 11 illustrates an exemplary alignment method, which may be performed during the calibration of the partial optical system 1000 illustrated in FIG. 10. The alignment method of FIG. 11 may be performed in part or in whole as an automated procedure.

At operation 1101, the alignment determines an angle of orientation of the DMD 605. The angle of orientation may be determined directly by, for example, physically measuring the angle of orientation of the DMD 605 in the projection system 100. Additionally or alternatively, the angle of orientation may be determined indirectly by, for example, illuminating the DMD 605 at a known angle and measuring the output angle of reflected light. In some implementations, operation 1101 may be performed in a test fixture before the DMD 605 is installed on its prism assembly.

At operation 1102, the alignment method calculates the appropriate linkage adjustment for the linkage 900, based on the measured angle of orientation of the DMD 605. Operation 1102 may include first calculating an appropriate rotational and/or translational adjustment to be made to the carrier body 931, and then determining the corresponding linkage adjustment of the linkage 900 that would cause such a rotational and/or translational adjustment.

The calculations of operation 1102 may be carried out at a time of calibration, or may be performed beforehand and stored in a lookup table associated with the projection system 100. In such an implementation, the calibration method may calculate the appropriate rotational and/or translational adjustment by referencing the lookup table instead of by performing calculations at the time of calibration. In other examples, the calibration method may calculate the appropriate rotational and/or translational adjustment at the time of calibration, and may use a lookup table to determine the corresponding linkage adjustment.

After the calculations of operation 1102, the alignment method drives the linkage at operation 1103 to impart the calculated orientation thereon. This actuation may be implemented by using a stepper motor, servo motor, or other appropriate adjustment mechanism as the drive mechanism 951. The drive mechanism 951 may be controlled by the controller 112 illustrated in FIG. 1. Operation 1103 further includes securing the linkage after it has been driven to the appropriate orientation. In some examples, the securing and/or adjustment of the linkage may be performed manually.

Effects

The above projection systems and calibration methods may provide for a configuration having illumination optics which are able to adjust and maintain the proper illumination angle, maintain focus of the aperture, maintain the location of the aperture, and perform all this in an architecture which uses a prism and fold mirror.

Systems, methods, and devices in accordance with the present disclosure may take any one or more of the following configurations.

(1) A projection system, comprising: a light source configured to emit a light in response to an image data; an illumination optical system configured to steer the light, the illumination optical system including a first mirror and a second mirror; a digital micromirror device including a plurality of micromirrors, wherein a respective micromirror is configured to reflect the steered light to a filter as on-state light in a case where the respective micromirror is in an on position and to reflect the steered light to a light dump as off-state light in a case where the respective micromirror is in an off position; and a controller configured to: determine a deviation between an actual angle of orientation of the digital micromirror device and an expected angle of orientation of the digital micromirror device, calculate a first amount of angle adjustment corresponding to the first mirror and a second amount of angle adjustment corresponding to the second mirror, and actuate the first mirror according to the first amount and the second mirror according to the second amount, thereby to maintain a position and a focus of the steered light on the digital micromirror device and to cause the on-state light to be incident within a predetermined distance from a center of the filter.

(2) The projection system according to (1), wherein the first mirror is located optically upstream from the second mirror.

(3) The projection system according to (2), wherein the first amount is smaller than the second amount.

(4) The projection system according to any one of (1) to (3), wherein the first amount and the second amount are proportional to the deviation.

(5) The projection system according to any one of (1) to (4), further comprising the filter, wherein the filter includes an aperture.

(6) The projection system according to any one of (1) to (5), wherein the first amount is between zero and 0.2 degrees.

(7) The projection system according to any one of (1) to (6), wherein the second amount is between zero and 0.6 degrees.

(8) The projection system according to any one of (1) to (7), wherein an f-number of the projection system is f15 or higher.

(9) The projection system according to any one of (1) to (8), wherein the position of the steered light on the digital micromirror device is maintained within 20 μm.

(10) The projector system according to any one of (1) to (9), wherein the first amount or the second amount includes a rotational displacement and a translational displacement.

(11) A method of calibrating a projection system including a light source configured to emit a light in response to an image data, an illumination optical system configured to steer the light, the illumination optical system including a first mirror and a second mirror, and a digital micromirror device including a plurality of micromirrors respectively configured to reflect the steered light to a filter as on-state light in a case where the respective micromirror is in an on position and to reflect the steered light to a light dump as off-state light in a case where the respective micromirror is in an off position, the method comprising: determining a deviation between an actual angle of orientation of the digital micromirror device and an expected angle of orientation of the digital micromirror device, calculating a first amount of angle adjustment corresponding to the first mirror and a second amount of angle adjustment corresponding to the second mirror, and actuating the first mirror according to the first amount and the second mirror according to the second amount, thereby to maintain a position and a focus of the steered light on the digital micromirror device and to cause the on-state light to be incident within a predetermined distance from a center of the filter.

(12) The method according to (11), wherein determining the deviation includes directly measuring the angle of orientation of the digital micromirror device.

(13) The method according to (11) or (12), wherein determining the deviation includes illuminating the digital micromirror device with the light from the light source, and measuring the output angle of light reflected from the digital micromirror device.

(14) The method according to any one of (11) to (13), wherein calculating the first amount and the second amount includes calculating ray traces based on an amount of the deviation.

(15) The method according to any one of (11) to (14), wherein calculating the first amount and the second amount includes using a lookup table based on an amount of the deviation.

(16) The method according to any one of (11) to (15), wherein the first amount and the second amount are proportional to the deviation.

(17) The method according to any one of (11) to (16), wherein the expected angle of orientation of the digital micromirror device is a first predetermined angle in the on position, and is a second predetermined angle in the off position.

(18) The method according to any one of (11) to (17), wherein the position of the steered light on the digital micromirror device is maintained within 20 μm.

(19) The method according to any one of (11) to (18), wherein actuating the first mirror includes rotating the first mirror and translating the first mirror, or actuating the second mirror includes rotating the second mirror and translating the second mirror.

(20) A non-transitory computer-readable medium storing instructions that, when executed by a processor of a projection system, cause the projection system to perform operations comprising the method according to any one of (11) to (19).

(21) A projection system, comprising: a light source configured to emit a light in response to an image data; an illumination optical system configured to steer the light, the illumination optical system including a mirror and a linkage; a digital micromirror device including a plurality of micromirrors, wherein a respective micromirror is configured to reflect the steered light to a filter as on-state light in a case where the respective micromirror is in an on position and to reflect the steered light to a light dump as off-state in a case where the respective micromirror is in an off position; a filter including an aperture; and a controller configured to: determine a deviation between an actual angle of orientation of the digital micromirror device and an expected angle of orientation of the digital micromirror device, calculate an adjustment amount of the linkage, and actuate the linkage according to the adjustment amount, thereby to maintain a position and a focus of the steered light on the digital micromirror device and to cause the reflected light to be incident within a predetermined distance from a center of the aperture.

(22) The projection system according to (21), wherein the controller is configured to actuate the linkage so as to pivot about a pivot point.

(23) The projection system according to (22), wherein the pivot point corresponds to a virtual location of the digital micromirror device in the absence of reflection.

(24) The projection system according to any one of (21) to (23), wherein the linkage includes a carrier body, a first connector, and a second connector.

(25) The projection system according to (24), wherein the first connector includes a first end attached to a first fixed hinge and a second end attached to a first free hinge, wherein the first free hinge is located on the carrier body.

(26) The projection system according to (24) or (25), wherein the second connector includes a first end attached to a second fixed hinge and a second end attached to a second free hinge, wherein the second free hinge is located on the carrier body.

(27) The projection system according to any one of (24) to (26), wherein an angle formed by the first connector and the second connector is between 10° and 40°.

(28) The projection system according to any one of (24) to (27), wherein an angle formed by the first connector and the second connector is 30°.

(29) The projection system according to any one of (24) to (27), wherein respective lengths of the first connector and the second connector are greater than or equal to 500 mm.

(30) The projection system according to any one of (24) to (29), wherein the linkage further includes a drive mechanism configured to actuate the carrier body.

(31) The projection system according to any one of (24) to (30), wherein an integrating rod is mounted on the carrier body.

(32) The projection system according to any one of (24) to (31), wherein the carrier body has a coffin-like shape.

(33) The projection system according to any one of (21) to (32), wherein the expected angle of orientation of the digital micromirror device is a first predetermined angle in the on position, and is a second predetermined angle in the off position.

(34) A method of calibrating a projection system including a light source configured to emit a light in response to an image data, an illumination optical system configured to steer the light, the illumination optical system including a mirror and a linkage, a digital micromirror device including a plurality of micromirrors respectively configured to reflect the steered light to a filter as on-state light in a case where the respective micromirror is in an on position and to reflect the steered light to a light dump as off-state light in a case where the respective micromirror is in an off position, and a filter including an aperture, the method comprising: determining a deviation between an actual angle of orientation of the digital micromirror device and an expected angle of orientation of the digital micromirror device, calculating an adjustment amount of the linkage, and actuating the linkage according to the adjustment amount, thereby to maintain a position and a focus of the steered light on the digital micromirror device and to cause the reflected light to be incident within a predetermined distance from a center of the aperture.

(35) The method according to (34), further comprising securing the linkage in an orientation, after the actuating.

(36) The method according to (34) or (35), wherein actuating the linkage includes pivoting the linkage about a pivot point.

(37) The method according to (36), wherein the pivot point corresponds to a virtual location of the digital micromirror device in the absence of reflection.

(38) The method according to any one of (34) to (37), wherein actuating the linkage includes actuating the carrier body via a drive mechanism.

(39) The method according to any one of (34) to (38), wherein calculating the adjustment amount includes calculating a rotational, translational, or rotational and translational adjustment to be made to a carrier body of the linkage, and determining a value of the adjustment amount corresponding to the rotational, translational, or rotational and translational adjustment.

(40) A non-transitory computer-readable medium storing instructions that, when executed by a processor of a projection system, cause the projection system to perform operations comprising the method according to any one of (34) to (39).

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A projection system, comprising:
   a light source configured to emit a light in response to an image data;
   an illumination optical system configured to steer the light, the illumination optical system including a first mirror and a second mirror;
   a digital micromirror device including a plurality of micromirrors, wherein a respective micromirror is configured to reflect the steered light to a filter as on-state light in a case where the respective micromirror is in an on position and to reflect the steered light to a light dump as off-state light in a case where the respective micromirror is in an off position; and
   a controller configured to:
   determine a deviation between an actual angle of orientation of the digital micromirror device and an expected angle of orientation of the digital micromirror device,
   calculate a first amount of angle adjustment corresponding to the first mirror and a second amount of angle adjustment corresponding to the second mirror, and
   actuate the first mirror according to the first amount and the second mirror according to the second amount, thereby to maintain a position and a focus of the steered light on the digital micromirror device and to cause the on-state light to be incident within a predetermined distance from a center of the filter.

2. The projection system according to claim 1, wherein the first mirror is located optically upstream from the second mirror.

3. The projection system according to claim 2, wherein the first amount is smaller than the second amount.

4. The projection system according to claim 1, wherein the first amount and the second amount are proportional to the deviation.

5. The projection system according to claim 1, further comprising the filter, wherein the filter includes an aperture.

6. The projection system according to claim 1, wherein the first amount or the second amount includes a rotational displacement and a translational displacement.

7. A method of calibrating a projection system including a light source configured to emit a light in response to an image data, an illumination optical system configured to steer the light, the illumination optical system including a first mirror and a second mirror, a digital micromirror device including a plurality of micromirrors respectively configured to reflect the steered light to a filter as on-state light in a case where the respective micromirror is in an on position and to reflect the steered light to a light dump as off-state light in a case where the respective micromirror is in an off position, and a controller, the method comprising:
   by the controller,
   determining a deviation between an actual angle of orientation of the digital micromirror device and an expected angle of orientation of the digital micromirror device,
   calculating a first amount of angle adjustment corresponding to the first mirror and a second amount of angle adjustment corresponding to the second mirror, and
   actuating the first mirror according to the first amount and the second mirror according to the second amount, thereby to maintain a position and a focus of the steered light on the digital micromirror device and to cause the on-state light to be incident within a predetermined distance from a center of the filter.

8. The method according to claim 7, wherein determining the deviation includes directly measuring the angle of orientation of the digital micromirror device.

9. The method according to claim 7, wherein determining the deviation includes illuminating the digital micromirror device with the light from the light source, and measuring the output angle of light reflected from the digital micromirror device.

10. The method according to claim 7, wherein calculating the first amount and the second amount includes calculating ray traces based on an amount of the deviation.

11. The method according to claim 7, wherein calculating the first amount and the second amount includes using a lookup table based on an amount of the deviation.

12. The method according to claim 7, wherein the first amount and the second amount are proportional to the deviation.

13. The method according to claim 7, wherein the expected angle of orientation of the digital micromirror device is a first predetermined angle in the on position, and is a second predetermined in the off position.

14. The method according to claim 7, wherein actuating the first mirror includes rotating the first mirror and translating the first mirror, or actuating the second mirror includes rotating the second mirror and translating the second mirror.

15. A non-transitory computer-readable medium storing instructions that, when executed by a processor of a projection system, cause the projection system to perform operations comprising the method according to claim 7.

* * * * *